Aug. 24, 1937.  H. H. BOYLE  2,091,092
DENTAL APPARATUS
Filed March 20, 1936
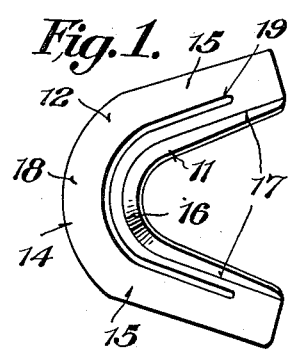
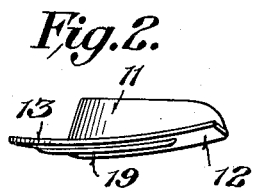
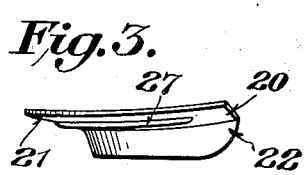
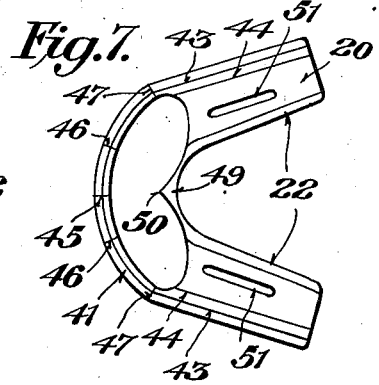
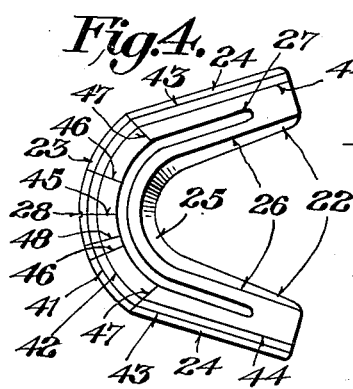
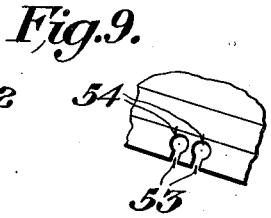
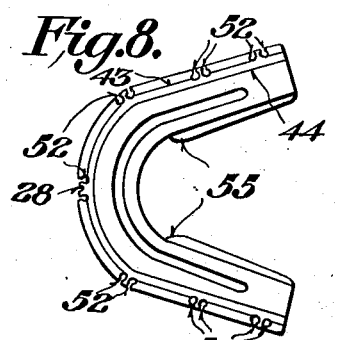
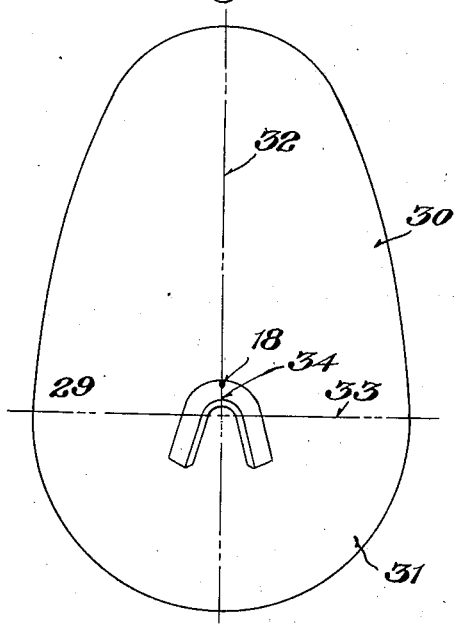
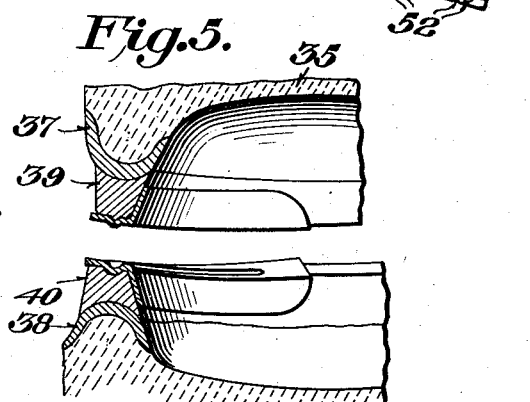
Inventor
Horace H. Boyle,
By D. P. Wolhaupter
Attorney Patented Aug. 24, 1937

2,091,092

UNITED STATES PATENT OFFICE 2,091,092

DENTAL APPARATUS

Horace Hayman Boyle, Swansea, Wales

Application March 20, 1936, Serial No. 69,964
In Great Britain March 4, 1935

3 Claims. (Cl. 32—32)

Applications in Great Britain have been filed under dates of March 4, 1935; April 26, 1935 and February 18, 1936.

This invention is for improvements in or relating to templates for more efficiently meeting the general and specialized requirements of mechanical and operative dentistry, and has for an object to facilitate the carrying out of various processes in mechanical and operative dentistry which require the general shape and arrangement of a set of teeth to be taken into account. The invention is of particular use in mechanical dentistry for facilitating the construction of occlusion models, and also in connection with the setting-up of artificial teeth. In addition the invention is applicable for use in checking the construction of artificial dentures, and in orthodontic work for checking the progress of correction of the irregularities of the teeth. In operative dentistry the invention is particularly applicable to the construction of splints for the treatment of fractures of the jaw, and it is also applicable to the treatment of haemorrhage.

According to the present invention there is provided a template having the general outline in plan of the shape of the tooth-carrying ridge of a jaw and having an occlusion surface corresponding to, and adapted to face towards, the occlusion aspect of the set of teeth for the jaw and a lingual or palatal flange corresponding to the lingual or palatal aspect of the said set of teeth. Such a template will enable occlusion models and models of splints to be readily formed to the desired shape as regards their occlusion and lingual or palatal surface, by moulding. Consequently the time required for trimming the models can be considerably reduced. Further, such a template enables a high degree of accuracy to be secured, because the template provides a reliable guide which can be used to determine various dimensions which the wax model is required to have. Such a template can also be employed for any other purpose where an indication of the occlusion and lingual or palatal surfaces is required. Preferably the template has its occlusion surface terminating outwardly in a free edge corresponding in shape to the general shape of the labio-buccal boundary of the said set of teeth. By having a free edge shaped thus an indication of the position of the said labio-buccal boundary is also provided, and this is of use for instance when trimming the labio-buccal surface of the wax model.

In a convenient construction the inner and outer boundaries of the anterior portion of the occlusion surface of the template are formed as arcs of concentric circles, and the inner and outer boundaries of the posterior portions of the occlusion surface form approximate continuations of the said arcs.

In carrying out the invention the occlusion surface of the template is curved to conform approximately to the curves defined by the incisal edges and the cusp ends of a set of teeth as seen in front and side elevation, with the occlusion surface also sloped as viewed in cross-section to correspond to the slope of the incisal edges and the cusp ends of the teeth. By this provision, occlusion or other models in wax can be made to fit together occlusally in a manner closely approaching that of opposed sets of teeth, and this results in certain advantages which will be referred to later.

Certain preferred forms to which the occlusion surface of the template may be shaped will be referred to later.

It is preferred to form the template in its portion which affords the occlusion surface with a depression extending along the length of each side portion of the template, and if possible continued around the arcuate anterior portion of the template. The depression or depressions provide for registering or stabilizing the fit of the occlusion surfaces of opposed wax bite-blocks when the bite is taken.

The invention also contemplates the provision of a template having its upper surface in the case of a lower template, or its lower surface in the case of an upper template, marked with one or more guiding lines each representing the position for a row of teeth. The above-mentioned depression or depressions may be utilized to afford the most inwardly placed guiding line or lines. The said upper or lower surface, as the case may be, is preferably also marked with a centre line and, in the case of a lower template, one or more other lines intersecting said guiding lines to indicate suitable widths for the teeth. The intersecting lines are provided for the purpose of guiding the dental technician in choosing suitable teeth and locating them when setting-up the teeth for a denture. They may also serve the purpose of indicating the correct widths and positions of the teeth when the template is used as a gauge for checking the accuracy of construction of the dentures.

Templates according to the present invention are particularly suited for use in forming occlusion models, and in setting-up artificial teeth, in cases where no natural teeth remain. The templates may be suitably modified however for cases of partial edentulousness, and for this purpose the invention includes a template formed with an aperture or apertures in its occlusion surface at the location or locations where natural teeth remain.

As will be explained later, when templates according to the invention are employed in the treatment of fractures, provision is preferably made for securing a complementary pair of templates together. The invention accordingly includes a template formed as described above and having its occlusion surface terminating outwardly in a free edge, and having the said free edge formed with inwardly extending ligature-receiving slots at intervals along its length, these slots being provided for the purpose of enabling opposed templates to be secured rigidly together with their occlusion surfaces in the proper setting.

The invention further includes the method of forming and mounting an occlusion model for use in mechanical dentistry which comprises moulding plastic modelling material by means of a template having any of the forms described above to form the occlusion model, mounting said model with the template in situ on a base-plate previously formed to the shape of the tooth-carrying ridge of a jaw, and effecting any necessary adjustments in the position or setting of the occlusion model on the base-plate or in the shape of the occlusion model by applying pressure as far as possible only to the template.

There is also included within the invention the method of setting-up artificial teeth in the manufacture of dentures which comprises mounting a template, marked with guiding lines as aforesaid, on a model of one jaw of the mouth in such a position as to indicate the level to which the teeth of the other jaw are to be set, and mounting the teeth in such manner that their occlusal ends lie on or in a chosen position relatively to one of the said guiding lines marked on the surface of the template.

The method according to the invention of preparing a splint for treatment of a fractured jaw comprises so mounting a template having any of the forms described above on a previously prepared model of the mouth on which the fracture has been reduced, that the occlusion surface of the template lies in a position corresponding to the correct position of the incisal edges and the cusp ends of the teeth, inserting plastic modelling material between the template and the model of the mouth, moulding the modelling material to a shape determined by the template and the model of the mouth, and forming the final splint to the shape of the modelling material.

There is also comprised within the invention the method of preparing a plastic model for the treatment of a bleeding lesion in the mouth, which comprises applying a roll of softened modelling material to a template of any of the forms described above, inserting the template with the softened modelling material into the mouth, taking an impression of the required portion of the mouth in the softened material, removing the template and the modelling material, and trimming the latter where necessary.

Certain preferred forms of template and methods of using them will now be described by way of example and with reference to the accompanying drawing.

In the drawing—

Figure 1 is an under plan view of an upper template in accordance with the invention.

Figure 2 is a view in side elevation of the template shown in Figure 2,

Figure 3 is a view similar to Figure 2 of a lower template which is complementary to the template shown in Figures 1 and 2.

Figure 4 is a plan view of the template shown in Figure 3.

Figure 5 is a side elevation view in central cross-section of portions of two opposed models of the mouth, illustrating the formation of bite-blocks, Figure 6 is a view corresponding to Figure 3, but illustrating a modification, Figure 7 is a plan view of the template shown in Figure 6, Figure 8 is a plan view of a template specially modified for the treatment of fractures of the jaw, Figure 9 is a detailed view of a portion of the template shown in Figure 8, on a scale larger than that of Figure 8, and Figure 10 illustrates a former to which the occlusion surface of the lower template may be shaped.

Like reference numerals indicate like parts throughout the drawing.

The template shown in Figures 1 and 2 is formed from rigid sheet material, preferably metal, and it will be seen from Figure 1 that it has the general outline in plan of the shape of the tooth-carrying ridge of a jaw. The template has a palatal flange 11 extending upwardly from a concave portion 12 which is formed with an occlusion surface 13 corresponding to and adapted to face towards the occlusion aspect of the set of teeth for the jaw. The palatal flange 11 extends upwardly from the inner boundary of the occlusion surface 13 and the latter terminates outwardly in a free edge 14, 15 corresponding in shape to the general shape of the labio-buccal boundary of the set of teeth for the jaw.

The anterior portion 14 of the said free edge is formed as the arc of a circle, and the side portions 15 of the free edge form continuations of the portion 14 and diverge backwardly at equal and suitable angles. The inner boundary of the convex portion 12 is indicated at 16 and 17 and is parallel to the outer edge 14, 15. The portion 16 of the inner edge is an arc of a circle which is concentric with the arcuate edge 14. A notch 18, which is preferably parallel-walled but may be of V-shape, is formed in the anterior edge 14 to indicate the centre of said edge. The convex portion 12 is formed with a keep constituted by a depression 19 extending along the major portions of the length of the sides of the template and continued around the anterior portion.

The template shown in Figures 3 and 4 is a lower template. It is formed of rigid sheet material, preferably metal, and has a concave portion 20 formed with an occlusion surface 21, and it also has a lingual flange 22. The shapes of the occlusion surface 21 and the lingual flange 22 correspond to the occlusion and lingual aspects of a lower set of teeth. The concave portion 20 terminates outwardly in a free polished edge having an anterior portion 23 and side portions 24 corresponding in shape to those of the upper template shown in Figure 1. The concave portion 20 also has its inner boundary indicated at 25 and 26 corresponding in shape to that of the convex portion of the upper template. The lower template is formed with a depression 27 corresponding to the depression 19 of Figure 1, and the centre of the anterior free edge is indicated by a notch 28 corresponding to the notch 18.

The upper and lower templates shown in

Figures 1 to 4 are a complementary pair and their convex and concave portions 12 and 20 are arranged to fit closely together. Since the templates are formed of sheet material of uniform thickness the occlusion surface 13 of the upper template is the obverse of the occlusion surface 21 of the lower template. The occlusion surfaces 13 and 21 are curved to conform approximately to the curves defined by the incisal edges and the cusp ends of a set of teeth as seen in front and side elevation and they are sloped as viewed in cross-section to correspond to the slope of the cusp ends of the teeth. An approximation to the desired curvature in side elevation and slope in cross-section can be secured by forming the occlusion surface to a spherical or spheroidal curvature. By thus curving the occlusion surfaces quite a satisfactory combination of results can be secured in certain cases. In general, however, the best combination of results is secured by having the anterior portion of the occlusion surface of each template formed as part of an ellipsoidal surface which is obtained by rotating an ellipse about its major axis, and which has its major axis lying in the medium plane of the dental arch, and by having the posterior portions of the occlusion surface formed as portions of a spherical or spheroidal surface which constitutes a continuation of the said ellipsoidal surface and has its radial centre in the said medium plane. When a spheroidal surface is used for the posterior portions of the occlusion surface, it is preferably constituted by a portion of a sphere varied slightly to ellipsoidal form at its posterior surface.

Figure 10 illustrates the formation of the concave portion 20 of the lower template. The template is placed with its surface intended to be uppermost in contact with a former indicated at 29 and consisting of an ellipsoidal anterior portion 30 and a spherical posterior portion 31. The template is placed with the median line of the dental arch, shown at 34, lying in a plane containing the axis which is common to the ellipsoidal and spherical portions 30 and 31 and which is indicated by the chain line 32. The template is also adjusted so that the portion of its occlusion surface which is bounded by the arcuate edge lies in front of the junction between the ellipsoidal and spherical surfaces, which junction is indicated in Figure 10 by the chain line 33. When the template has been adjusted in this manner its portion which is to be concave is worked to the shape of the former 29.

The shaping of the occlusion surface of the upper template is accomplished by matching its convexly curved portion 12 to the previously formed concave portion 20 of the lower template.

A convenient sphere diameter for a spherical former and for the spherical portion of the former 29 is approximately 22.2 centimetres. The ellipsoidal surface to which the anterior portion of the occlusion surface of the template is made to conform is one whereof the circle traced by the ends of the minor axis of the basic ellipse is coincident with a great circle of the said spherical or spheroidal surface, and whereof the apex is at a distance equal to or less than the diameter of the sphere or spheroid from the centre of the sphere or spheroid. Thus the former 29 in Figure 10 is of the shape of a solid of revolution formed by rotating about its major axis a continuous curve consisting of a semi-circle joined to half an ellipse, the ellipse having its minor axis coincident with the diameter of the semi-circle and lying on the chain line 33. The former 29 is represented on a reduced scale as having a posterior spherical portion of 22.2 centimetres in diameter and an interior ellipsoidal portion whereof the apex is at a distance of 22.2 centimetres from the centre of the sphere.

The templates shown in Figures 1 to 4 are particularly suitable for forming bite-blocks in cases where none of the natural teeth remain, and the method adopted in forming such bite-blocks will now be described with reference to Figure 5. After impressions of the mouth have been taken and plaster models, portions of which are indicated at 35 and 36 in Figure 5, have been made and duly shaped up and trimmed and suitable base plates 37 and 38 have been shaped to the models of the mouth, bite-blocks 39 and 40 are shaped by means of the upper and lower templates and are applied to the base plates 37 and 38. The templates are, of course, chosen to be suitable for the models of the mouth, and in practice the templates will be chosen from a standard range of templates which differ from one another in size, curvature and/or shape. After a suitable complementary pair of templates has been selected a roll of softened wax or other suitable modelling material is applied to the under surfaces of the lower template to form the bite-block 40, and the template and bite-block are applied to the base plate 38. The wax is then compressed manually by applying pressure to the template and any necessary adjustments in the position or setting of the bite-block 40 are effected also by applying pressure to the template. Such pressure is applied as far as possible only to the template. The labio-buccal surface of the bite-block 40 is then trimmed by a suitable tool which is guided along the outer edge 23, 24 of the template. It will be appreciated that the depression 27 in the lower template will form a corresponding depression in the bite-block 40. The bite-block 39 is prepared in a similar manner by the use of the upper template.

For the operation of taking the bite the templates are removed and the base plates 37 and 38 together with the bite-blocks 39 and 40 are placed in the patient's mouth. If the occlusal level of either bite-block is found to be reasonably accurate in vertical, horizontal and lateral relationships the occlusion surface of this block is not altered. The other bite-block is then adapted to the unaltered bite-block by trimming and cutting its surfaces prior to taking the bite. The adapted bite-block is superficially softened, replaced in the mouth and the patient instructed to press the jaws together with the bite-blocks interposed in the usual manner. The depressions formed in the occlusion surfaces of the bite-blocks corresponding to the depressions 19 and 27 serve to register or stabilize the fit of the occlusion surfaces. Thus, the depression in the occlusion surface of the unaltered bite-block may be used to mould a corresponding ridge on the other bite-block to assist fixation and stabilization of one bite-block to the other.

The employment of the improved template in the formation of bite-blocks results in the advantage that the occlusion surfaces of the bite-blocks can be formed to suitable curves readily and quickly. There is secured a great reduction in the time usually given to the manipulative construction of bite-blocks. Further, the moulding of the lingual and palatal surfaces by the template and the shaping of the labio-buccal surfaces by the aid of the outer edges of the templates enables neater and better bite-blocks than those made heretofore to be formed. The operation of taking the bite is rendered freer from possible errors. Greater accuracy may be achieved in the operation of taking the bite by reason of the provision of the suitably curved occlusion surfaces.

For the purpose of facilitating the setting up of teeth, and for other purposes which will be mentioned later, the upper surface of the lower template or the lower surface of the upper template, or both such surfaces, are marked with suitable guiding lines. These are shown on the upper surface of the lower template in Figure 4. They comprise arcuate guiding lines 41 and 42, referred to heretofore as "segmental" lines, and rearwardly extending guiding lines 43 and 44 forming rearward continuations of the lines 41 and 42. The guiding lines 41, 43, and 42, 44 extend parallel to the edges 23 and 24 of the template, and the arcuate lines 41, 42 are therefore concentric with the inner and outer boundaries 23 and 25 of the anterior portion of the occlusion surfaces. The guiding lines are preferably engraved on the template. Each of the guiding lines 41, 42, has its radius equal to the distance measured along the dental arch represented by the arcuate guiding line from the mesial surface of a central incisor tooth to the distal surface of a canine tooth on the same side of the dental arch.

The upper surface of the template is also marked with a centre line 45 and two other lines 46 intersecting the guiding lines 42 and 41 to indicate suitable widths for the tooth. Two further lines indicated at 47 mark the ends of the arcuate guiding lines 41 and 42 and the ends of the arcuate free edge 23. The lines 45, 46, and 47 are engraved in the surface of the template and they all converge towards the radial centre of the arcuate lines 41 and 42. The lines 46 are set at equal angles to the centre line 45 and these angles are so chosen that they mark respectively, where they cross a dental arch, the locations of the distal edges of an upper central incisor tooth which can be set up on that dental arch. Thus, a 9 millimetre template could have its anterior arcuate edge shaped to the arc on which 9 millimetre teeth are to be set and it could be marked with two segmental guiding lines as shown at 41 and 42 indicating the arcs on which 8 millimetre and 7 millimetre teeth could respectively be set. The measurements given by way of example are stated in terms of the widths of the central incisor teeth. The radial lines 46 would in this case cross the anterior edge 23 and the segmental lines 41 and 42 respectively at 9, 8, and 7 millimetres distant from the centre line 45 measured along the segments.

In order to provide for uniform setting up of the posterior teeth the buccal edge 24 of the template and the posterior portions 43 and 44 of the guiding lines on one side of the template are set at an angle to the centre line 45 which is equal to the angle between the centre line 45 and the buccal edge 24 and the posterior portions 43 and 44 of the guiding lines on the opposite side. The buccal edges 24 and the portions 43 and 44 of the guiding lines extend backwards from any suitable points on the corresponding dental arch which lie towards each end of a given arch or segment. Thus the backwardly extending edges and portions of the guiding lines may spring from the segmental edge and lines at points which are displaced from the centre line 45 at distances, measuring along the corresponding dental arches, each equal to the measurement from the mesial point of a central incisor tooth to the apex of the cusp of the corresponding canine tooth on the same side in a row of teeth conforming to the appropriate dental arch. The buccal edges 24 and the portions 43 and 44 of the guiding lines may however instead spring from any other suitable points symmetrically disposed with respect to the centre line 45.

The procedure followed in setting up artificial teeth by the use of a marked template will now be described. When the bite has been taken and the models have been articulated accurately on a hinged articulator, a suitable marked template is mounted on the corresponding model of the mouth with a quickly adjusted support of modelling wax, or other modelling material interposed between the model and the template to bring the latter to the required level relatively to the mode, that is to say, the level which the cusp ends of the teeth are to occupy. For practical reasons, a lower template will be used, mounted as aforesaid on the lower model, and the upper teeth will be set up first.

The preferred procedure in the case of an edentulous mouth is to employ a lower template as shown in Figures 3 and 4. After the template has been adjusted to the correct horizontal, vertical and lateral settings, the upper central incisor teeth are set in correct position on a wax base previously mounted on the upper model and the template is afterwards adjusted to them. The latter adjustment of the template consists in moving it if necessary forwardly or backwardly until the distal edges of the upper central incisor teeth lie on the angle lines 46. The remainder of the upper teeth are then set up so that their cusp ends will touch the curved surface of the template, and so that the teeth are in an alignment corresponding to one of the guiding lines 42, 44 and 41, 43 or the outer edge 23, 24 or on an imaginary line which is parallel to said guiding lines. The line to which the teeth are set is that on which the edges of the upper central incisor teeth lie after the final adjustment of the template as aforesaid has been made. After setting up all the upper teeth the template is removed and the lower teeth are set up on a wax base on the lower model, the lower teeth being set to the upper teeth. Only minor adjustments will be required to adapt the set-up and articulated teeth to any variations preferred by the operator. The dental surgeon or the dental mechanic can effect these adjustments either before the dentures leave the laboratory or after they have been tried in the patient's mouth.

In order to facilitate the selection of a lower set of artificial anterior teeth to be complementary in their width measurements to an upper set of artificial anterior teeth it is preferred to mark the template with an additional angle line 48, see Figure 4. This additional angle line is disposed radially of the said segmental guiding lines 41 and 42 and is set relatively to the centre line 45 at an angle of two-thirds of the angle between the centre line 45 and one of the angle lines 46. For example if one of the segmental lines 41 and 42 or the edge 23 is crossed by the angle lines 46 at distances of 9 mm. from the centre line 45, the additional angle lines 48 will cross the same segmental line or the edge at a distance of 6 mm. from the centre line 45. Thus when the marked or imaginary line along which the upper teeth are to be set has been decided upon as aforesaid, the point where it is crossed by the additional angle line 48 indicates by its distance along the dental arch from the centre line 45 the width of a lower central incisor tooth which will be complementary to the width measurements of the upper central incisor teeth used.

The foregoing description of the method of setting up teeth applies to cases where the conventional setting is followed, that is to say, cases in which all the anterior teeth are arranged in mesial and lateral contact at the points of contact and all the posterior teeth are arranged in mesial and distal contact on their points of contact with the distal point of contact of each canine tooth in contact with the mesial or anterior point of contact of the first premolar tooth in posterior relation to it on the same side. Variations of this conventional arrangement may however readily be secured by the use of templates marked as aforesaid, and any suitable adaptation of these variations may be employed by the dental technician when the conventional arrangement is either impossible or undesirable. The variations above referred to are as follows:—

(1) When the models of the mouth are wider than normal or the upper anterior artificial teeth to be used are narrower than is usual for the width of the models, the upper anterior artificial teeth are spaced slightly apart. This may be effected by setting up the upper anterior teeth along a segmental line or a segmental interspace which is in front of that which would be used according to the conventional setting. In a variation of this type the posterior teeth will be set up along backwardly extending lines or interspaces each springing from the position of the apex of the canine tooth cusp on the corresponding side, or from any other suitable point.

(2) If the models of the mouth are narrower than is normal, or the upper anterior artificial teeth to be used are wider than is usual in relation to the width of the models, the upper anterior central incisor teeth, or all the incisor teeth may be set up so as to be in front of the segmental line or interspace chosen for the general arrangement of the upper set of teeth. The upper anterior teeth will thus not lie along segmental lines or interspaces, but the canine teeth will lie on the appropriate segmental line or interspace. The segmental line or interspace on which the canine teeth will be set will be behind that which would be used in the conventional arrangement for teeth of the same size. Adaptation by overlapping the anterior teeth may be contrived or the teeth may be otherwise set up in such manner that they will be crowded together. In a variation of this kind the posterior teeth may also be set up along backwardly extending lines or interpaces each springing from the position of the apex of the canine tooth cusp on the corresponding side, or from any other suitable point.

(3) When the angle between the posterior portions of the tooth-receiving ridge of the jaw is not reasonably coincident with the angle between the buccal external edges of the template and between the guiding lines marked parallel to those edges, as shown by the model of the mouth, the posterior teeth may be set at a greater or smaller angle than that of the templates. In a variation of this kind each of the first premolar teeth may be set up in correct posterior relationship to the corresponding canine tooth, and the remaining posterior teeth are afterwards set up at the required angle as indicated by the model of the mouth. Thus the posterior teeth are not set up to lie on the posterior portions 43 and 44 of the guiding lines. However, these portions of the guiding lines afford guidance to the dental technician in setting up the posterior teeth, for the latter will be set up at a definite angle to the guiding lines, and this angle will be the same on each side of the mouth.

By modifying the templates suitably they can be used in cases when the mouth is only partially edentulous. For this purpose the occlusion surface of the template is cut away or formed with an aperture or apertures at a location corresponding to the position or positions of the natural teeth remaining. A template modified in this way can be used for forming bite-blocks in the manner described above, and if it is also provided with suitable markings it can be used for the setting up of artificial teeth. A modified template which is suitable for use when all of the front natural teeth remain is shown in Figures 6 and 7. The template shown in these figures is a lower template which corresponds to the template of Figures 3 and 4, except that the segmental portion of its occlusion surface and the anterior portion of its lingual flange are formed with an aperture 49 at the location where the natural teeth remain. The edges of the aperture 49 which are afforded by the lingual flange extend symmetrically in graceful curves meeting in a point 50 at the level at which the lingual flange joins the occlusion surface. The point 50 affords a posterior indication of the centre line of the occlusion surface. Further, instead of employing depressions 27 extending around the segmental portion of the template as in Figure 4, two separate depressions 51 are formed one in each posterior portion of the occlusion surface. The portions 44 of the inner guiding line terminate forwardly at the aperture 49, but the portions 43 of the outer guiding line are each joined as before by an arcuate portion 41. The latter runs in front of the aperture 49. The centre line 45 and angle lines 46 and 47 extend inwardly from the anterior edge 23 and terminate at the aperture 49. When desired an upper template can be modified similarly and in this case the guiding lines marked on its anterior portion will run behind the aperture which extends to the location of the natural teeth. The templates used for modification as shown in Figures 6 and 7 are normally shaped templates of a sufficiently large size to accommodate the markings between either the outer or the inner curved edge of the template, as the case may be, and the aperture corresponding to the location of the natural teeth. It is thus possible to have the sizes and shapes of the templates standardized.

Three examples of the use of marked templates for setting up artificial teeth in cases of partial edentulousness will now be given.

*Example I*

When the posterior teeth are all absent in the upper and lower models of the mouth and the models have been articulated, a lower template as shown in Figures 6 and 7 is used. The template is adjusted as described above on a bed of modelling wax, or other modelling material, provided on the lower model of the mouth. The upper posterior teeth are then set up to the concave upper surface of the template in correct mesio-distal relation to one another and along or in a chosen relationship to a suitable guiding line. After these teeth have been set up it is only necessary for the dental technician to set the lower teeth to the upper teeth following the removal of the template.

Example II

When the upper jaw is edentulous and the whole of the lower teeth are absent except the central, lateral and cuspid, the suitable template for use will be the modified lower template shown in Figures 6 and 7. The aperture 49 is formed at a location corresponding to the position of the existing central, lateral and cuspid natural teeth and the outer marked segmental surface of the template is retained. After the models have been articulated the modified template is placed, as has been previously described, on a bed of modelling material. The template is suitably adjusted in position to enable the upper anterior teeth to be set up with their incisal edges extending along a segmental guiding line or along a segmental interspace between, in front of or behind the guiding lines. After this has been done the posterior upper teeth are set up along the rearward portions of the said guiding lines or interspace, or they are set up as above described in accordance with any suitable variations from the conventional arrangement. After the upper teeth have been set up to the occlusion surface of the template it is only necessary for the dental technician to set the lower teeth to the upper teeth following the removal of the modified template.

Example III

When the lower jaw is edentulous and the whole of the upper teeth are absent except the central, lateral and cuspid, a modified upper template might be used. The template could be modified similarly to the lower template shown in Figures 6 and 7 except for having the guiding lines running behind the aperture which corresponds to the location of the existing central, lateral and cuspid natural teeth. The same procedure might be followed as in Example II except that the template would be mounted on the upper model of the mouth, the lower teeth would then be set up to the appropriate guiding line or interspace on the template, and the upper posterior teeth would be set up to the lower teeth following the removal of the template.

The procedures described above for setting up artificial teeth are applicable to all existing systems of setting up the teeth and marked templates can be used with all existing types of articulating machines. The marked templates afford guidance to the dental technician such as has not previously been provided, and accurate setting up of artificial teeth is greatly facilitated. Moreover the provision of the marked templates enables variations of the segmental curve, and of the angle between the posterior teeth, and of the plane of the teeth to be more accurately secured than has been possible heretofore.

After placing a template in the correct position on the model of the mouth and before setting up the posterior teeth, the choice of suitable posterior teeth for a given case can be made by the dental technician with special consideration of the occluso-cervical or height measurements and the mesio-distal or width measurements because the gap between the occlusion surface of the template and the ridge of the model is entirely visible from all aspects.

Figures 8 and 9 show a template which has been specially modified for use in preparing a splint in the treatment of a fractured jaw. This modified template corresponds in shape to that shown in Figures 3 and 4 except that its outwardly directed free edge is formed with ligature-receiving slots 52 and the anterior curved portion of the lingual flange has been removed so that the side portions of this flange terminate forwardly in curved edges 55. The modified template shown is a lower template. In practice complementary upper and lower templates are used, and the upper template has the anterior curved portion of its palatal flange removed and is formed with ligature-receiving slots precisely similar to and arranged to register with the slots 52 in the lower template.

The ligature-receiving slots and the anterior portions of the lingual and palatal flanges may be cut away during the construction of the templates or the dental mechanic could cut them away from a standard template if necessary. When specially constructed templates are used for the treatment of fractures the templates are not formed with the depression 27 since the latter is not needed for fracture treatment. The depression 27 is however present when a standard template is cut down and adapted for fracture treatment by the dental mechanic. Figure 8 shows a standard lower template which has been so modified. It will be seen that the ligature-receiving slots are arranged in pairs, there being two pairs spaced apart along each side of the template, a pair at each end of its front segmental edge and a central pair having its notches on opposite sides of the notch 18. Each notch 52 is of keyhole shape, see Figure 9, so as to afford a constricted mouth 53 terminating inwardly in an enlargement 54 reaching towards the other slot of the same pair. Only one slot in each pair need be formed with the enlargement 54, though it is preferred to have them both formed in this way as shown. It is found convenient to form each slot so that its constricted mouth 53 extends inwardly for a distance of 0.5 millimetre and so that its enlargement 54 has a diameter of 1.0 millimetre.

The templates formed with the slots 52 are used in the preparation of fracture splints and they are intended to be secured to the splints proper. The slots 52 permit the templates with the splints to be ligatured together by the surgeon either during or after fixation of the splints in the mouth. Instead of having the templates formed with the slots 52 any other suitable means may be employed for assisting ligaturing of the templates together.

The cutting away of the front portions of the lingual and palatal flanges of the templates is carried out for the purpose of facilitating feeding the patient. Instead of cutting away the whole of the front portion of each flange a suitable feeding aperture or apertures may be afforded by cutting away only a portion of one or both flanges. Also it may be desirable in some cases to cut away in addition part of the segmental front portion of each template adjacent to the lingual or palatal flange in order to provide a suitable contour for accommodation of the patient's tongue especially at its tip.

For the preparation of fracture splints the occlusion surfaces of the templates are curved precisely as described in connection with the template shown in Figures 1 and 2. When preparing a fracture splint for an edentulous patient it is however advantageous to interrupt the curvature continuity of the occlusion surface of one or of both templates at the centre line of the anterior segmental portion in order to provide a feeding aperture at the centre of the aperture of the patient's lips. For this purpose the portion of each template (or of one template) which afforded the occlusion surface may be formed with a groove or depression running from the front to the back of the segmental portion and along the centre line. When both templates are formed with a groove or depression it may in each case be semi-circular or semi-elliptical in cross-section when viewed from the front of the template, so that a round or oval opening is afforded when the templates are brought together and ligatured in position in the mouth.

The following description indicates the procedure to be followed in preparing a fracture splint, and suitable variations of procedure which may be introduced to meet the requirements of any given problem:—

(1) Impressions of the mouth are taken by any usual method.

(2) The impressions are cased in plaster, artificial stone, or other suitable material in the usual manner and models of the mouth obtained.

(3) The fracture is reduced on the models in the laboratory and the models are accurately articulated to the correct bite on an articulator in the usual manner. The articulator should preferably be of advanced design.

(4) The bite is opened sufficiently to enable the dental technician to adjust a suitable complementary pair of templates after they have been waxed together at their portions affording their occlusion surfaces. The templates are adjusted to touch some of the cusps of the teeth and they are also adjusted to make anteroposterior, central, horizontal and lateral corrections.

(5) The under surfaces of the lower templates and upper surfaces of the upper templates are fixed by means of modelling wax to the teeth, and modelling wax is applied to "wax up" each template prior to final testing on the articulator.

(6) The occlusion surfaces of the templates are separated and cleaned free of wax to allow the technician to test the movements of the occlusion surfaces upon one another and, if necessary, correct the setting of the templates until they move freely upon one another, with corresponding movements applied to the articulator.

(7) The modelling wax under and at the sides of each template is moulded to a shape determined by the template and the model of the mouth, and it is trimmed where necessary preparatory to substituting for it gold, silver, vulcanite or other suitable material used to form the splint proper. If a template as shown in Figures 8 and 9 is used, the notched labio-buccal edges are left slightly projecting outwards as free edges.

(8) The gold, silver, vulcanite or other suitable material from which the final splint is to be made is cast, vulcanized, or otherwise processed in such manner as to bring it to the shape of the wax model with the templates in situ and so that the final splint is secured to the template with its surfaces which are defined by the shape of the template in contact with the corresponding surfaces of the template. The whole assembly is then prepared and polished for insertion in the mouth.

(9) Each template with its metal vulcanite or other material lining is suitably fixed in the mouth, and according to the nature of severity of the fracture the templates are united at their portions affording their occlusion surfaces by means of ligature wire or in any other suitable manner. When slotted templates as shown in Figures 8 and 9 are used the ligature wire is passed into all the slots of complementary pairs on the opposed templates and is drawn into the enlargements of the slots. The wire is then tightened to clamp the templates together and afterwards secured in place by being bound round itself or otherwise. Alternatively, the templates may remain unattached at their occlusion edges when the nature of the fracture permits of free movement of the mandible with the template splints cemented in position.

The use of the templates in treatment of fractures gives the following advantages:—

(a) In numerous cases of fracture of the maxilla or mandible the construction of dental splints is greatly facilitated and such dental splints will be better adapted for the purposes of immobilizing the fragments than is possible by methods now ordinarily in use.

(b) The splints will be more easily adapted and they will have greater efficiency and adaptation than those used heretofore.

(c) The splints will be more accurately and more easily ligatured together than is commonly possible.

(d) Suitable apertures for feeding the patient can be provided without recourse to manipulative skill.

(e) In cases of severe fracture, when the complementary template splints have been ligatured together until weak osseous union has taken place, the removal of the ligature wires will enable a measure of the masticatory function to be restored by permitting the patient to use the occlusion surfaces of the template splints for masticating food prior to the complete removal of the template splints at such subsequent date as may be desirable. The efficiency of such masticatory effort will be dependent upon the skill of the dental technician in constructing the template splints and the curvatures of the occlusion surfaces of the templates.

(f) In cases of fracture when ligaturing together of the upper and lower splints is necessary, the ligatures can be removed at an earlier date than is permissible when any present existing method is employed because the occlusion surfaces of the templates are curved obverse planes which slide smoothly over one another when approximated.

(g) Because of the possible early removal of ligatures the power of speech can be restored to the patient at a relatively early date in cases cited under (f).

(h) Such splints will be clean in use and control of sepsis, a factor of great importance, is adequately and completely provided for.

Instead of having the templates secured to the final splints, the latter may have formed on them occlusion surfaces corresponding to those of the templates and the splints may be adapted to be ligatured directly to one another. In such a procedure any of the templates shown in the drawing could be used for forming the splint.

Marked templates, as above described, can be used in orthodontic work to act as gauges against which the models of the irregular teeth, in a given case, can be examined, and against which the progress of the natural or assisted correction of irregularities of the teeth can be noted.

For this purpose the templates are inserted into the patient's mouth from time to time and the positions of the irregular teeth in relation to the occlusion surfaces and guiding lines are noted. The use of such marked templates in this way provides a method of gauging irregularities of the teeth and of recording, measuring, and noting progress in orthodontic work in a manner not possible by any existing method.

Marked templates, as above described, can also be used in the examination of artificial dentures to serve as gauges against which the dentures can be examined and faults in the alignment of the teeth or in the setting of the artificial teeth noted, especially when the setting of the teeth has been done in a conventional manner, or when teeth have been set up according to variations as above described. The use of marked templates in this way will provide a method of gauging faults in the alignment of, and in the setting of artificial teeth in dentures, and of noting and recording, and to some extent measuring these faults, in a simple and accurate manner not possible by any present existing method.

Templates as above described and illustrated in the drawing can also be used in the treatment of haemorrhage. In order that a template may be used for this purpose a roll of softened dental composition or other suitable material is placed on the under surface of a selected template and an impression of the jaw is taken. After this has been done the dental composition with the template in situ is trimmed and suitably shaped and the appliance is reinserted into the mouth, (a medicated pad having previously been placed on the bleeding region). The patient is instructed to use the teeth of the opposite jaw to effect compression. A four tailed bandage may be applied or other method adopted to assist compression.

By the use of templates in the manner above described effective appliances can be very quickly constructed and applied to bleeding lesions in a manner not possible when any present existing method is used.

It will be appreciated that by the use of the templates described above the various processes for which they are intended can be carried out with a considerable saving of time, and greater accuracy can be secured than has been possible heretofore.

It is to be understood that the invention is not restricted to the precise constructional details shown in the drawing. For instance there may be added wherever desirable, means for strengthening the templates and/or retention means to adapt a template for permanent fixation to a plastic material. Also since the required angle of setting of the posterior portions of templates, while being equal on each side of a template, varies with different anthropological groups, it is to be understood that suitable variations in the said angle of setting are included within the scope of the invention.

Having now particularly described and ascertained the nature of my said invention and in what manner the same is to be performed, I declare that what I claim is:—

1. A dental template of substantially U-shape having an occlusion surface the forward portion of which conforms in contour to a portion of an ellipsoidal surface generated by rotating about its major axis an ellipse having a minor axis dimension of approximately 22 centimeters and a major axis dimension of approximately twice its minor axis dimension, said forward portion of said occlusion surface conforming to a portion of such an ellipsoidal surface directly adjacent to a plane at right angles to the major axis of the ellipse and including its minor axis, with the rear of said forward portion based on said plane and the longitudinal axis of said forward portion disposed in a plane including the major axis of the ellipse, the rear portion of said template conforming in contour to a spherical surface having a diameter equal to the minor axis dimension of the ellipsoidal surface.

2. A dental template as set forth in claim 1 having a flange along its inner edge extending therefrom at the side thereof opposite its occlusion surface.

3. A dental template as set forth in claim 1 having ligature receiving slots opening through its outer edge, said slots being formed in pairs and at least one slot of each pair having an enlargement extending toward the other slot of the same pair.

HORACE HAYMAN BOYLE.